United States Patent
Takahashi et al.

(10) Patent No.: US 6,420,034 B1
(45) Date of Patent: Jul. 16, 2002

(54) BINDER COMPOSITION AND PROCESS FOR MANUFACTURING BOARD BY USING THE BINDER COMPOSITION

(75) Inventors: Akihiro Takahashi, Kanagawa; Masaki Sugawara, Chiba; Takeshi Ito, Kanagawa; Hisashi Hokonohara, Kanagawa; Hideki Todoroki, Kanagawa; Hiroaki Sakaguchi, Kanagawa, all of (JP)

(73) Assignee: Mitsui Chemicals, Inc. (JP)

(*) Notice: Subject to any disclaimer, the term of this patent is extended or adjusted under 35 U.S.C. 154(b) by 0 days.

(21) Appl. No.: 09/555,341
(22) PCT Filed: Oct. 13, 1998
(86) PCT No.: PCT/JP98/04591
§ 371 (c)(1),
(2), (4) Date: May 30, 2000
(87) PCT Pub. No.: WO00/22021
PCT Pub. Date: Apr. 20, 2000

(51) Int. Cl.$^7$ ............... C08J 3/00; C08K 3/20; C08L 75/00; B32B 27/00; B32B 27/40
(52) U.S. Cl. ............ 428/423.1; 524/507; 524/589; 524/590; 524/591; 524/839; 524/840; 524/13; 527/103; 527/301; 527/401
(58) Field of Search .............. 428/423.1; 524/507, 524/589, 590, 591, 839, 840, 13; 527/103, 301, 401

(56) References Cited

U.S. PATENT DOCUMENTS 5,744,538 A * 4/1998 Miller et al. ............... 524/539

FOREIGN PATENT DOCUMENTS

| EP | 0354516 | 8/1989 |
| JP | 50-87192 | 7/1975 |
| JP | 51-33193 | 3/1976 |
| JP | 60-63114 | 4/1985 |
| JP | 60-221415 | 11/1985 |
| JP | 61-174260 | 8/1986 |
| JP | 2-160997 | 6/1990 |

* cited by examiner

*Primary Examiner*—Patrick D. Niland
(74) *Attorney, Agent, or Firm*—Burns, Doane, Swecker & Mathis, L.L.P.

(57) ABSTRACT

The present invention provides, in the preparation of a hot press molded board from a lignocellulose or an inorganic material as a main raw material, an isocyanate-based binder composition with which a board having eternally good releasability from a hot press plate, excellent physical properties and a low hygroscopic linear expansion coefficient can be obtained with improved productivity. The binder composition comprises (A) a compound having at least two isocyanate groups, (B) a low molecular weight polyethylene and (C) water as indispensable components.

15 Claims, 9 Drawing Sheets

US 6,420,034 B1

BINDER COMPOSITION AND PROCESS FOR MANUFACTURING BOARD BY USING THE BINDER COMPOSITION

TECHNICAL FIELD

The present invention relates to a binder composition suitable for producing a hot press molded board from a lignocellulose and/or an inorganic material as a main raw material. Also, the present invention relates to a process for producing a hot press molded board from a lignocellulose and/or an inorganic material as a main raw material.

BACKGROUND ART

In molded articles made of a lignocellulose as a main raw material, those in which the lignocellulose is a wood chip are called as a particle board Besides the particle board, there are a wafer board made of a large-sized chip and an oriented strand board (OSB) in which long and slender chips (strands) are oriented in a certain direction. Also, those in which the lignocellulose is a wood fiber are called as an insulation board, a hardboard, or a medium-density fiber board (MDF). Further, those made of an inorganic material as a main raw material are produced by using a rock wool or shirasu. These boards are used as a flooring material, a wall material, a door material, a soundproofing material, a heat insulating material, a mat core material, a furniture member, an automobile member, a floor primary material, etc.

As binders for molding a particle board, a wafer board, an OSB, an insulation board, a hardboard, a medium-density fiber board, a rice hull board prepared by molding a rice hull, a kaoliang board prepared by molding a kaoliang stalk, an inorganic board made of an inorganic material as a raw material, and the like (these boards being hereinafter simply referred to as "board" or "boards"), there have hitherto been widely used a thermosetting urea resin, melamine resin, urea-melamine resin, melamine-urea resin, phenol resin, phenol-melamine resin, melamine-phenol resin, etc. (these binders being hereinafter simply referred to as "formaldehyde-based binder" or "formaldehyde-based binders"). The formaldehyde-based binders have such characteristics that they are inexpensive, are superior in adhesion and are set within a relatively short period of time. However, it is being demanded that the amount of formaldehyde released from products obtained by hot press molding by using a formaldehyde-based binder is further reduced. As countermeasures for reducing the amount of formaldehyde to be released, there have hitherto been employed a method in which the amount of free formaldehyde in a formaldehyde binder is reduced (a molar ratio of formaldehyde to phenol, melamine or urea in the formaldehyde-based binder is lowered) and a method in which a formaldehyde catcher (scavenger) is added at the time of compounding of the formaldehyde-based binder. Also, there has been proposed a use of a non-formaldehyde-based binder (for example, an isocyanate-based binder).

However, in case that the hot press molding is carried out by using an isocyanate-based binder as the binder for a hot press molded board, attachment of the binder to a hot press surface (platen) (metal) occurs due to its excellent adhesion. As a result, it takes much labors to remove attached materials from the hot board.

In order to solve this problem, additives to organic polyisocyanates for improving the releasability from the metal (these additives being referred to as "internal releasing agent" or "internal releasing agents") are being investigated. For example, there are proposed alkyl phosphates or pyrophosphates, sulfonated compounds, waxes and liquid esters, aliphatic carboxylic acids, montan waxes and/or carnauba waxes, and the like as additives to organic polyisocyanates. In addition, the present applicant has proposed metal soaps of a fatty acid as a releasing agent effective for urethane compounds.

Also, as another method, there has been proposed a method in which a releasing agent is applied directly to a hot press surface (platen) prior to the hot pressing (such releasing agent being referred to as "external releasing agent"). For example, there are a method in which a release layer using a metal soap is formed and a method in which a polysiloxane film having a functional group is used.

However a binder which is superior in physical property to that obtained by the above-described methods and which can be used for longer period is desired.

DISCLOSURE OF THE INVENTION

An object of the invention is to provide, in the preparation of a hot press molded board from a lignocellulose or an inorganic material as a main raw material, an isocyanate-based binder composition with which a board having eternally good releasability from a hot press plate, excellent physical properties and low hygroscopicity can be obtained with improved productivity.

The present inventors have made extensive and intensive studies on a binder composition suitable for producing a hot press molded board from a lignocellulose or an inorganic material as a main raw material. As a result, it has been found that it is effective to contain a compound having at least two isocyanate groups or its reaction product and a low-molecular weight polyethylene as essential components in the binder composition, leading to the accomplishment of the present invention. Also, it has been found that in a process for producing a hot press molded board from a lignocellulose or an inorganic material as a main raw material, when a low-molecular weight polyethylene is used as a releasing agent component to be used in the binder, eternally good releasability from a hot press surface (platen) is obtained, leading to achievement of the present invention.

That is, the present invention is to provide the following (1) to (24).

(1) A binder composition comprising:
  (A) a compound having at least two isocyanate groups or its reaction product,
  (B) a low-molecular weight polyethylene, and
  (C) water.
(2) A binder composition as set forth in (1), wherein a weight ratio of the compound having at least two isocyanate groups or its reaction product (A) to the low-molecular weight polyethylene (B) is from 1:0.001 to 1:1.
(3) A binder composition as set forth in (1) or (2), wherein the low-molecular weight polyethylene (B) has a number average molecular weight (MN) by gel permeation chromatography (GPC) of from 500 to 7,000 in terms of monodispersed polystyrene.
(4) A binder composition as set forth in (1) or (2), wherein the low-molecular weight polyethylene (B) has a number average molecular weight (MN) by gel permeation chromatography of from 1,000 to 6,000 in terms of monodispersed polystyrene.
(5) A binder composition as set forth in (1) or (2), wherein the low-molecular weight polyethylene (B) has a ratio of weight average molecular weight (MW) to number average molecular weight (MN) by gel permeation chromatography is from 1.2 to 3.0.

(6) A binder composition as set forth in (1) or (2), wherein the low-molecular weight polyethylene (B) has a ratio of weight average molecular weight (MW) to number average molecular weight (MN) by gel permeation chromatography is from 1.5 to 3.0.
(7) A binder composition as set forth in (1) or (2), wherein the low-molecular weight polyethylene (B) has a branching structure.
(8) A binder composition as set forth in (1) or (2), wherein the low-molecular weight polyethylene (B) has a density of from 0.800 to 0.980.
(9) A binder composition as set forth in (8), wherein the low-molecular weight polyethylene (B) has a density of from 0.800 to 0.925.
(10) A binder composition as set forth in (8), wherein the low-molecular weight polyethylene (B) has a functional group selected from —OH, —COOH, or —CHO and has a density exceeding 0.940.
(11) A binder composition as set forth in (1) or (2), wherein the low-molecular weight polyethylene (B) has an endothermic peak by a differential scanning calorimeter (DSC) at from 30° C. to 120° C.
(12) A binder composition as set forth (1) or (2), wherein the low-molecular weight polyethylene (B) has an endothermic peak by a differential scanning calorimeter (DSC) at from 40° C. to 100° C.
(13) A binder composition as set forth in (1) or (2), wherein the low-molecular weight polyethylene (B) has at least three methyl group carbon atoms per 100 carbon atoms in the low-molecular weight polyethylene (B).
(14) A binder composition as set forth in (1) or (2), wherein the low-molecular weight polyethylene (B) has at least four methyl group carbon atoms per 100 carbon atoms in the low-molecular weight polyethylene (B).
(15) A binder composition as set forth in (1) or (2), wherein the low-molecular weight polyethylene (B) is used as an aqueous emulsion or suspension comprising the water (C) as a dispersion medium.
(16) A binder composition as set forth in (15), wherein the aqueous emulsion or suspension of the low-molecular weight polyethylene (B) comprising the water (C) as a dispersion medium has a mean particle size of from 100 to 10,000 nm.
(17) A binder composition as set forth in (1) or (2), wherein the compound having at least two isocyanate groups or its reaction product (A) comprises a reaction product of (D) a monofunctional alcohol having from 80 to 99% by weight of a recurring unit of (—$CH_2CH_2$—O—) and a compound having at least two isocyanate groups.
(18) A binder composition as set-forth in (1) or (2), wherein the compound having at least two isocyanate groups or its reaction product (A) is emulsified or dispersed in water by using (E) a bifunctional to octafunctional polyol having from 5 to 70% by weight of a recurring unit of (—$CH_2CH_2$—O—) in the structure thereof.
(19) A binder composition as set forth in (18), wherein the compound having at least two isocyanate groups or its reaction product (A), the low-molecular weight polyethylene (B), the water (C), and the polyol (E) are formed in an aqueous dispersion by using an in-line mixer and then used.
(20) A binder composition as set forth in (1) or (2), wherein the compound having at least two isocyanate groups or its reaction product (A) is polymethylene polyphenyl diisocyanate (polymeric MDI).
(21) A process for the production of a board by using a lignocellulose-based material and a binder, wherein the binder is a binder composition as set forth in any one of (1) to (20).
(22) A process for the production of a board by using an inorganic material and a binder, wherein the binder is a binder composition as set forth in any one of (1) to (20).
(23) A board obtained by a process as set forth in (21).
(24) A board obtained by a process as set forth in (22).

BEST MODE FOR CARRYING OUT THE INVENTION

Figure 1:
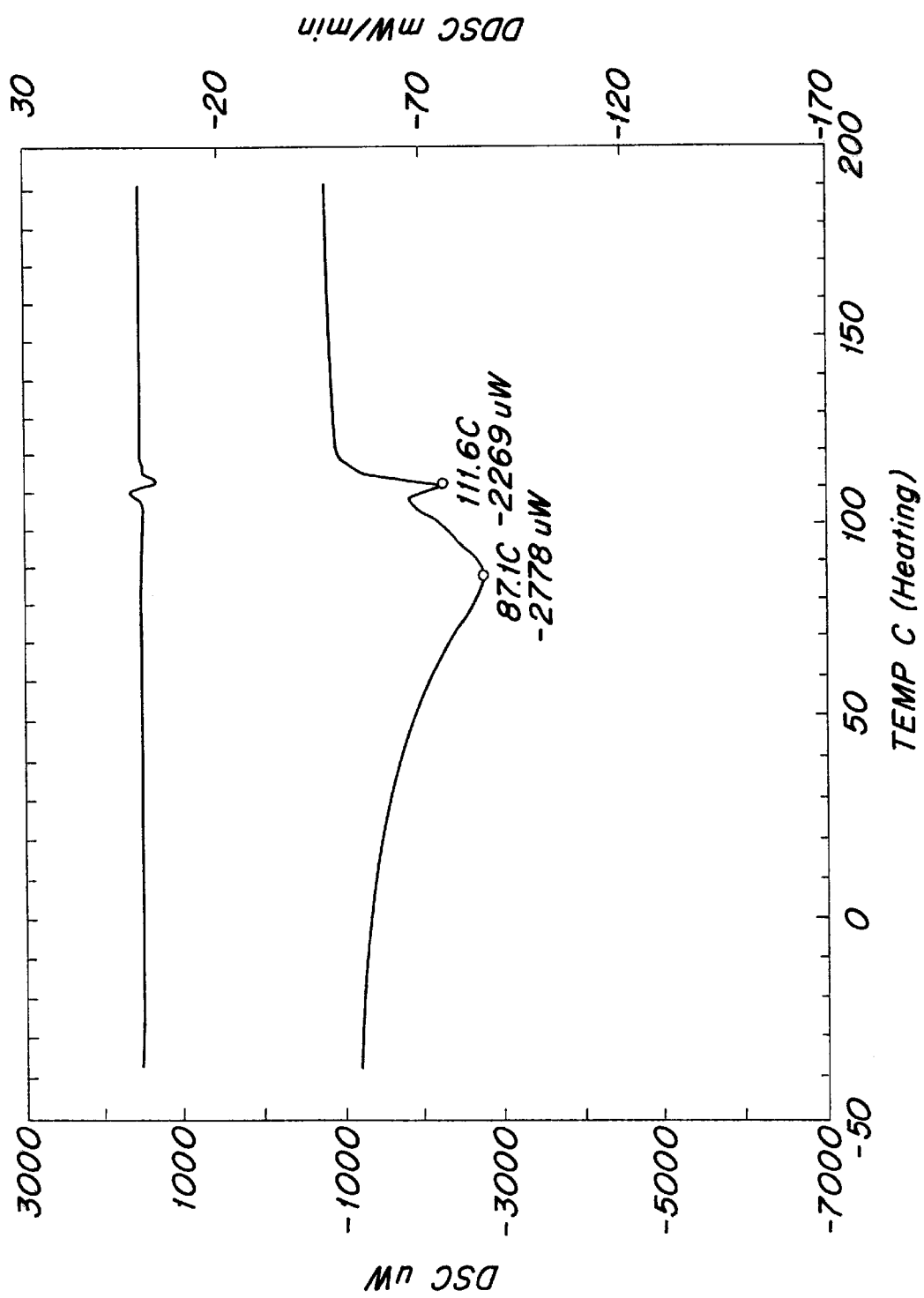
FIG. 1 is a DSC chart of a low-molecular weight polyethylene used in the present invention (a trade name "Mitsui Hiwax 220P", made by Mitsui Chemicals, Inc.)

Each of the components constituting the binder composition of the present invention is hereunder described in detail.

In the present invention, in the components of the binder composition, the compound having at least two isocyanate groups or its reaction product (A) (hereinafter being briefly referred to as "the compound having at least two isocyanate groups (A)") is a substantial binder component, and the low-molecular weight polyethylene (B) is a substantial releasing agent component. Further, the water (C) is an active hydrogen containing compound necessary for setting the compound having at least two isocyanate groups (A). Still further, the monofunctional alcohol (D) is an auxiliary for emulsifying/dispersing the compound having at least two isocyanate groups (A) in water, and the polyol (E) not only is an auxiliary for emulsifying/dispersing the compound having at least two isocyanate groups (A) in water but also improves the crosslinking density thereby contributing to the physical properties of board.

In the present invention, any compounds having at least two isocyanate groups can be used, and organic isocyanate compounds are usually used. Also, those having a plurality of isocyanate compounds reacted can be used. In case that a plurality of isocyanate compounds are reacted, the isocyanate compounds may be the same as or different from each other. Specific examples of the compound having at least two isocyanate groups (A) include the following compounds:

Aromatic isocyanates or polyisocyanates such as diphenylmethane diisocyanate (MDI), polymethylene polyphenyl isocyanate (polymeric MDI), tolylene diisocyanate (TDI), and naphthalene diisocyanate; aliphatic isocyanates or polyisocyanates such as hexamethylene diisocyanate (HDI) and lysine methyl ester diisocyanate; and alicyclic isocyanates or polyisocyanates such as hydrogenated phenylmethane diisocyanate, isophorone diisocyanate, norbornene diisocyanate, and hydrogenated tolylene diisocyanate. Of these is preferred polymeric MDI from the standpoints of toxicity and cost.

As the low-molecular weight polyethylene (B) which is used in the present invention, those having a branching structure are preferred. Examples of factors for exhibiting a degree of branching include the density, the number of methyl groups (—CH$_3$) in the molecular structure, and the melting point, and they are closely related to each other.

Although the density at 25° C. is not particularly limited, it is generally from 0.800 to 0.980, and preferably from 0.850 to 0.95. A good releasing effect can be obtained when the density is within the above-defined range. While as a polyethylene having a density of from 0.800 t 0.925 at 25° C., those not having a functional group such as —OH, —COOH, and —CHO are preferred, in case that a polyethylene having a density exceeding 0.940 at 25° C. is used, it is more preferred to use one having a functional group such as —OH, —COOH, and —CHO in the molecule thereof.

In case that the top of an endothermic peak as measured by a differential scanning calorimeter (DSC) is defined as a melting point, the melting point of the low-molecular weight polyethylene (B) is preferably from 30° C. to 120° C., and more preferably from 40° C. to 110° C. A good releasing effect can be obtained when the melting point is within the above-defined range.

The number of methyl groups in the molecular structure can be measured by H$^1$-NMR, and the number of methyl groups per 100 carbon atoms in the low-molecular polyethylene (B) is preferably at least two, more preferably at least three, and most preferably at least four. A sufficient releasing effect can be obtained when the number of methyl groups per 100 carbon atoms in the low-molecular weight polyethylene (B) is at least two.

The molecular weight can be measured by gel permeation chromatography (GPC), and the low-molecular weight polyethylene (B) has a number average molecular weight (MN) of from 500 to 7,000, and preferably from 1,000 to 6,000 in terms of monodispersed polystyrene. A preferred releasing effect can be obtained when the number average molecular weight (MN) is within the above-defined range. A ratio (MW/MN) of weight average molecular weight (MW) to number average molecular weight (MN) by gel permeation chromatography (GPC) is preferably from 1.2 to 3.0, and more preferably from 1.5 to 3.0. A preferred releasing effect can be obtained when the MW/MN ratio is within the above-defined range.

If the low-molecular weight polyethylene (B) has the above-defined physical properties, there are no particular restrictions on the production process and the like. For example, those obtained by directly polymerizing ethylene or copolymerizing ethylene and other α-olefins, those obtained by thermally decomposing a high-molecular weight polyethylene or high-molecular weight polyethylene copolymer, and paraffin waxes can be used without particular limitations.

A suitable weight ratio of the compound having at least two isocyanate groups (A) to the low-molecular weight polyethylene (B) is from 1:0.001 to 1:1. If the weight of (B) is less than 0.001, a sufficient releasing effect tends to be hardly obtained.

With respect to the use method of the low-molecular weight polyethylene (B) according to the present invention, there are no particular restrictions as to the method and mode so far as it is present between a board and a caul plate (and a hot press surface (platen)). For example, the low-molecular weight polyethylene (B) can be directly applied on a caul plate surface (and a hot press surface (platen)) or can be mixed with a raw material element (for example, chips, in case of particle boards; fibers, in case of fiber boards such as MDF; strands, in case of OSB; and inorganic powders, in case of inorganic boards, respectively). The low-molecular weight polyethylene (B) can be mixed prior to drying of the element in case of lignocellulose boards or can be mixed into the binder composition at the same time in a blender or blow line in case of MDF. Usually, it is suitably mixed into the binder composition.

In order to obtain a continuous releasing effect, it is preferred that the low-molecular weight polyethylene (B) is formed into an aqueous emulsion or dispersion by using water as a dispersion medium and used as an internal releasing agent. A particle diameter of the aqueous emulsion or dispersion is preferably from 100 to 10,000 nm. The particle diameter is measured by means of a laser beam scattering type particle diameter measurement device. Specifically, the measurement was carried out by using a Coulter Counter Model N4 manufactured by Coulter Inc. The measurement is carried out in a customary manner such that some droplets of the aqueous emulsion or dispersion of the low-molecular weight polyethylene (B) are charged in a cell, and after the emulsion concentration has fallen within a proper range of the device, the measurement is effected.

It is a simple way to mix the aqueous emulsion or dispersion in the binder composition and use the resulting mixture.

In case that the low-molecular weight polyethylene (B) is used as an internal releasing agent, since the amount of the low-molecular weight polyethylene (B) to be moved into the caul plate surface (and the hot press surface (platen)) is insufficient at the beginning, it is preferred that the low-molecular weight polyethylene (B) is molten and applied onto the caul plate surface (and the hot press surface (platen)) in advance.

As a method for dispersing or emulsifying the low-molecular weight polyethylene (B) in water, general production methods of wax emulsion are applicable. For example, after melting the low-molecular weight polyethylene (B), the molten polyethylene (B) can be added into water containing an emulsifier or dispersant with stirring, thereby effecting the emulsification or dispersion. Alternatively, the emulsification or dispersion can be mechanically carried out in force by using a pulverizer such as a ball mill. The emulsifier or dispersant which can be used in this case can include those which are generally used. Specific examples include anionic surfactants such as fatty acid soaps, rosin soaps, alkyl sulfonates, alkylbenzene sulfonates, dialkylaryl sulfonates, alkyl sulfosuccinates, polyoxyethylene alkyl sulfates, and polyoxyethylene alkylaryl sulfates; and nonionic surfactants such as polyoxyethylene alkyl ethers, polyoxyethylene alkylaryl ethers, polyoxyethylene sorbitan fatty acid esters, and an oxyethylene propylene block copolymers. However, it is not to be construed that the present invention is limited to these emulsifiers. These surfactants can be used singly or in admixture of two or more thereof.

The water (C) which is used in the present invention can be present in advance in the material element of board (that is, a lignocellulose or an inorganic powder). It is preferred that the water (C) is used as water for emulsifying or dispersing the compound having at least two isocyanate groups (A) or the low-molecular weight polyethylene (B). Accordingly, the water (C) is used in an amount sufficient to set the compound having at least two isocyanate groups (A).

Examples of the monofunctional alcohol (D) which is used in the present invention include addition polymers of ethylene oxide or propylene oxide starting from an alcohol such as methanol. The recurring unit (—$CH_2CH_2$—O—) of the ethylene oxide in the monofunctional alcohol (D) preferably accounts for from 80 to 99% by weight, and more preferably from 90 to 98% by weight. From the standpoint of the emulsification properties of the reaction of the compound having at least two isocyanate groups and the monofunctional alcohol (D), the amount of the recurring unit is preferably at least 80% by weight. On the other hand, from the standpoint of the stability of the reaction product, the amount of the recurring unit is preferably at most 99% by weight. Further, it is preferred that the monofunctional alcohol (D) has a molecular weight of from 200 to 2,000. If the molecular weight of the monofunctional alcohol (D) is 200 or more, the emulsification performance is superior. On the other hand, it is preferred from the standpoint of the compatibility with MDI that the molecular weight of the monofunctional alcohol (D) is 2,000 or less.

In case that the monofunctional alcohol (D) is contained in the compound having at least two isocyanate groups (A), a content of (D) in (A) is preferably from 0.5 to 10% by weight, and more preferably from 2 to 5% by weight. From the standpoint of the emulsification properties of (A) obtained as the reaction product with the compound having at least one isocyanate group, the content of (D) to be used is preferably at least 0.5% by weight, whereas from the standpoint of the waterproof strength, the content of (D) is preferably at most 10% by weight.

As the polyol (E) which is used in the present invention, various polyols can be used singly or in admixture of two or more thereof. Specific examples thereof include polyhydric alcohols alone, such as propylene glycol, ethylene glycol, glycerin, pentaerythritol, trimethylolpropane, sorbitol, polypropylene glycol, diethylene glycol, polyethylene glycol, butylene glycol, triethanolamine, hexanetriol, granulated sugar, and polyvinyl alcohol; polyether polyols obtained by addition polymerization of these polyhydric alcohols with alkylene oxides such as ethylene oxide, propylene oxide, and butylene oxide; polyether polyols obtained by addition polymerization of amines such as ethylenediamine and o-tolylenediamine with alkylene oxides such as ethylene oxide, propylene oxide, and butylene oxide; and polyester polyols obtained by reaction of the above-described polyhydric alcohols with aliphatic saturated fatty acids such as adipic acid, pimelic acid, sebacic acid, and azelaic acid, unsaturated fatty acids such as maleic acid, itaconic acid, and fumaric acid, or aromatic fatty acids such as phthalic acid and terephthalic acid, or anhydrides thereof alone or in admixture.

The polyols (E) which can be used alone or in admixture of two or more thereof preferably have an OH value of from 20 to 900. If the OH value is less than 20, the resulting board may lack in elasticity. On the other hand, if the OH value exceeds 900, the reaction with the isocyanate may proceed excessively. For these reasons, the OH value of the polyols is preferably from 20 to 900, and more preferably from 25 to 600. From the standpoints of the handling and cost, polyether polyols obtained by addition polymerization of polyhydric alcohols such as propylene glycol, ethylene glycol, glycerin, and pentaerythritol with alkylene oxides such as ethylene oxide, propylene oxide, and butylene oxide are preferably used.

In case that polyols obtained by addition polymerization of amines such as ethylenediamine and o-tolylenediamine as a starting substance with alkylene oxides such as ethylene oxide, propylene oxide, and butylene oxide are used, since the polyols contain a tertiary amine, the reactivity of the organic polyisocyanate is improved, whereby the pressing time can be shortened. In addition, in this case, since the isocyanate groups are inactivated to a proper degree, the adhesion to a metal is lowered so that the amount of the releasing agent to be used can be reduced.

In the compound having at least two isocyanate groups (A) and the polyol (E), a molar ratio (NCO/OH) of the isocyanate group (—NCO) to the hydroxyl group (-OH) is preferably from 2 to 60,000. From the standpoint of the physical strength of a board molded article (that is, occurrence of poor adhesion after hot-press pressing, occurrence of peeling of a part of the core layer portion, or a so-called blister prevention), the NCO/OH molar ratio is preferably at least 2. On the other hand, from the standpoints of obtaining good emulsion or dispersion properties and increasing the crosslinking density, the NCO/OH molar ratio is preferably at most 60,000. The NCO/OH molar ratio is more preferably from 5 to 50,000, and most preferably from 6 to 40,000.

The number of functional groups of the polyol is preferably from 2 to 8. When an alcohol having a plurality of functional groups is used, probably for reason that the crosslinking density likely increases, the strength of the board is likely obtained. For the purposes of improving the emulsification properties of the compound having at least two isocyanate groups (A) and increasing the strength of the board, the number of functional groups as the polyhydric alcohol is preferably from 2 to 8, and more preferably from 3 to 6.

In the polyol (E) which is used in the present invention, it is preferred that the recurring unit of (—$CH_2CH_2$—O—) in the structure is contained in an amount of from 5 to 70% by weight based on the weight of the polyol (E). From the standpoint of the emulsification performance, the amount of the recurring unit of (—$CH_2CH_2$—O—) is preferably at least 5% by weight, whereas from the standpoint of the compatibility with the polyisocyanate, it is preferably at most 70% by weight, based on the weight of the polyol (E).

Examples of the lignocellulose-based material which is used in the present invention include strand chips, dust chips, or flake chips used as wood chips for a particle board, an OSB (oriented strand board), a wafer board, or an LSL (laminated strand lumber); fibers used for a hardboard, an MDF, or an insulation board; and agricultural products such as a kaoliang stem, baggasse, and rice hull. These raw materials can be used alone or in combination of two more thereof.

Examples of the inorganic material which is used in the present invention include porous perlite or vermiculite obtained by heat expanding rock wool, perlite, obsidian, vermiculite, or shirasu, and finely hollow glass balloon, shirasu balloon, or the like starting from expanded shirasu, alumina, fly ash, silica sand, shale, or the like. In order to prepare a light-weight molded article, a bulk density of the inorganic foam-containing articles is preferably at most 0.3 g/cm$^3$. In order to improve the adhesion to the binder, the inorganic foam-containing particles can be subjected to surface treatment with a silane coupling agent, or the like.

With respect to the ratio between the binder and the lignocellulose-based material or inorganic material, a ratio of the compound having at least two isocyanate groups (A) to the lignocellulose-based material or inorganic material is in the range of from 1:100 to 30:100 by weight, and preferably from 2:100 to 20:100. When the amount of the compound having at least two isocyanate groups (A) is 1 part by weight or more based on 100 parts by weight of the lignocellulose-based material or inorganic material, an effect as the binder can be obtained, and when the compound having at least two isocyanate groups (A) is used in an amount of 30 parts by weight based on 100 parts by weight of the lignocellulose-based material or inorganic material, sufficient physical properties of the board are obtained.

In the present invention, as machines to be used for emulsification or mixing in case of the formation of an emulsification or dispersion of the compound having at least two isocyanate groups (A), the low-molecular weight polyethylene (B), the water (C), and the polyol (E), those which are known can be employed. However, in the present invention, it is preferred to use the following emulsification or mixing machines.

The in-line mixer which is used in the present invention can be either a static type mixer or a technical type mixer having a rotor/stator in the pipeline. Further, a type in which the respective liquids come into collision with each other and mixed can be used. Specific examples include a Kenics type, a Hydroshear manufactured by A.P.V. Gaulin Inc. and a Ramond mixer manufactured by Ramond Inc. for the static type; and a TK Homomic line mill manufactured by Tokushu Kika Kogyo Co., Ltd., and an Ebara Milder manufactured by Ebara Kikai K.K. For the high-pressure collision type, a general high-pressure charging machine or high-pressure expanding machine for polyurethane, or a high-pressure spray coating machine for polyurethane can be used as a substitute. In addition, a low-pressure expanding machine can also be used. Specific examples include MEG-HK series manufactured by Maruka Kakoki K.K., H-2000 manufactured by GUSMER Inc., and Toho A-250 type manufactured by Toho Kikai K.K. However, there are a lot of kinds for the emulsification or mixing machine, and the present invention is not to be construed to be limited to the above-exemplified emulsification and mixing machines. Also, in case of lignocellulose boards using waste chips as a raw material, such as particle boards, though no formaldehyde is generated from the binder composition, formaldehyde is generated from the waste chips as the raw material.

In addition, there may be a case where a conventional formaldehyde-based binder is used in combination with the binder composition according to the present invention. In such a case, it is effective to use a formaldehyde catcher (scavenger) to the surface layer and/or core layer portion. As the formaldehyde catcher (scavenger), any materials which are reacted with formaldehyde can be effectively used, and ammonium salts of acids, alkali metal sulfites, and the like are effective. Further, of these materials are preferred urea, guanylurea, melamine, and ammonia, each having an amino group.

As the addition method, the formaldehyde catcher (scavenger) can be present in the board at the time of the production of a board and can also be added to the binder composition. Further, it is effective to add the formaldehyde catcher (scavenger) to the material element prior to drying, or to the material element in the blender.

So far as the desired effects are not inhibited, the compound having at least two isocyanate groups (A) according to the present invention can be used in combination with ultraviolet absorbers, antioxidants, plasticizers, silane coupling agents, metallic catalysts, synthetic or natural rubber latices, acrylic emulsions, vinyl acetate emulsions, poval, water repellents, defoaming agents, etc.

The low-molecular weight polyethylene (B) can be used in combination with at least one member of conventional releasing components which do not inhibit the releasing effect, such as natural waxes, metal soaps, organopolysiloxane compounds, phosphorus-based compounds, and fluorine-based compounds.

The present invention is described in detail with reference to the following Preparation Examples, Examples and Comparative Examples. The contents are shown in Table 1. In these Examples, all ratios and percentages are on a weight basis unless otherwise indicated. It is not to be construed that the present invention is limited to these Preparation Examples and Examples.

The terms used in the Examples and Table 1 have the following meanings.

Ratio:
  5 Constitutional ratio in a finished board on a non-volatile matter basis.

Type of Raw Material of Board:
  Raw material name for the production of a board.

Water Content (%) of Raw Material of Board:
  Water content of raw material on a dry basis before the production of a board.

Releasability:
  Releasability from a caul plate after the production of a board.

Physical Properties of Board:
  Module of rupture: The bending strength was measured in a normal state according to JIS (Japanese Industrial Standard)-5905 and JIS-5908, etc.
  Density: The density was measured at 21° C. and 65% RH.

PREPARATION EXAMPLE 1

Figure 2:
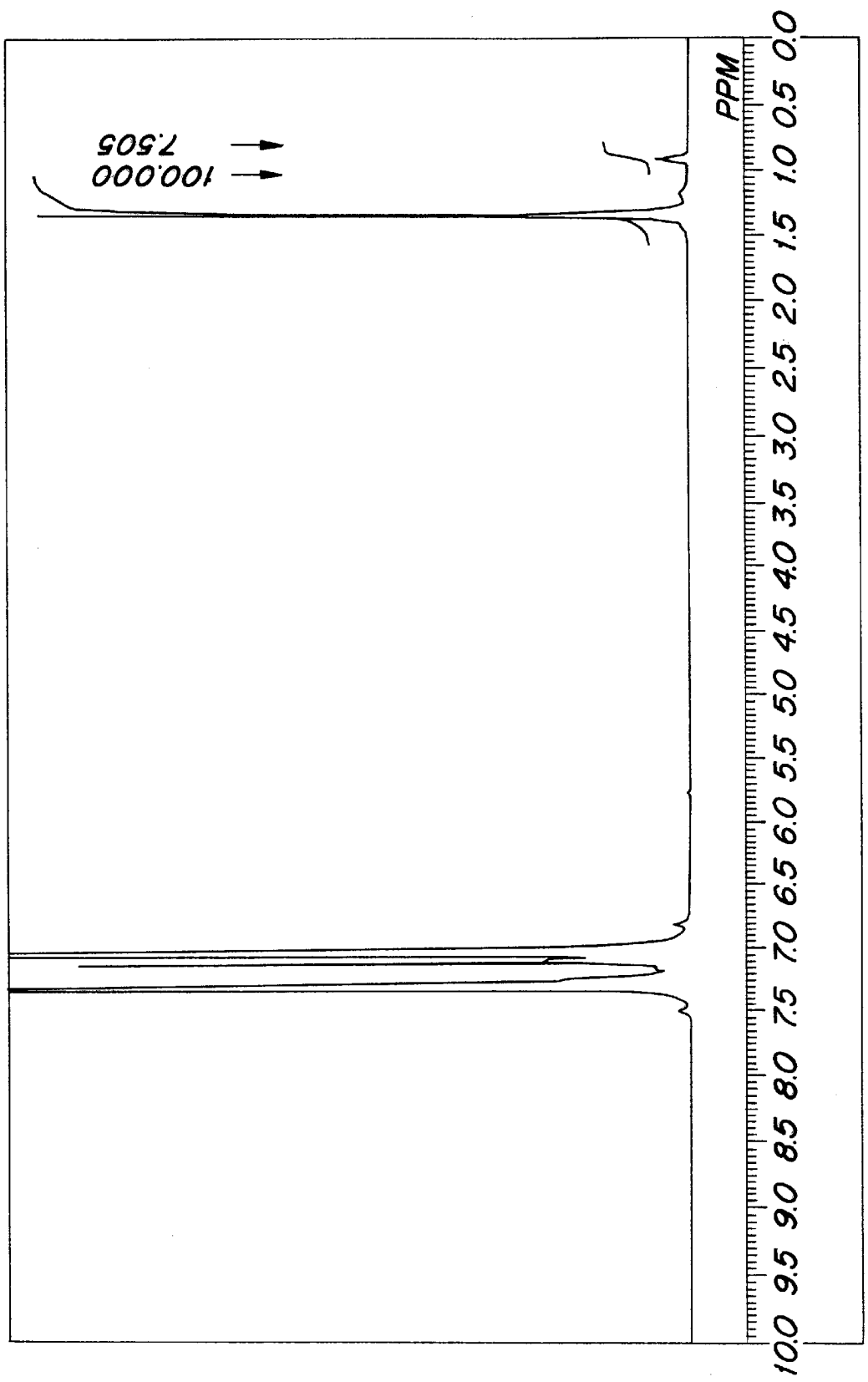
FIG. 2 is an $H^1$-NMR chart of a low-molecular weight polyethylene used in the present invention (a trade name "Mitsui Hiwax 220P", made by Mitsui Chemicals, Inc.)

300 g of a low-molecular weight polyethylene (a trade name "Mitsui Hiwax 220P", made by Mitsui Chemicals, Inc., having the properties as set forth below, whose DSC chart and $H^1$-NMR chart are shown in FIG. 1 and FIG. 2, respectively) were charged into a one-liter flask and heated for melting at 115° C. in an oil bath. Separately, 685 g of distilled water were charged into a one-liter plastic cup and heated to 95° C., and 15 g of a sodium alkylsulfate (a trade name "Emal 10", made by Kao Corporation) were added thereto and dissolved therein under stirring. Thereafter, the "Emal 10" aqueous solution was added in the flask at a rate of 20 ml/min. by means of a metering pump while stirring the molten "Mitsui Hiwax". After completion of the addition of the "Emal 10" aqueous solution, the emulsion was gradually cooled to obtain an aqueous emulsion dispersion of "Mitsui Hiwax 220P". The dispersion was further pulverized by means of a pulverizer (a trade name "Homomic line mill", manufactured by Tokushu Kika Kogyo Co., Ltd.) to obtain a fine dispersion. As a result of measurement of the particle size (by using a trade name "Coulter Counter Model N4", manufactured by Coulter Inc.), the fine dispersion was found to have a mean particle diameter of 500 nm. Further, the fine dispersion was added to water so as to have a content of the active ingredient of 10% and then provided for the test of Example 1.

[Properties of "Mitsui Hiwax 220P"]
  Molecular weight by gel permeation chromatography (GPC) in terms of monodispersed polystyrene: MN=2,000, MW/MN=2.5

Melting point measured by a differential scanning calorimeter (DSC): 110° C.

Density (at 25° C.): 0.92

Number of methyl groups per 100 carbon atoms in the molecule: about 4.8

PREPARATION EXAMPLE 2

Figure 3:
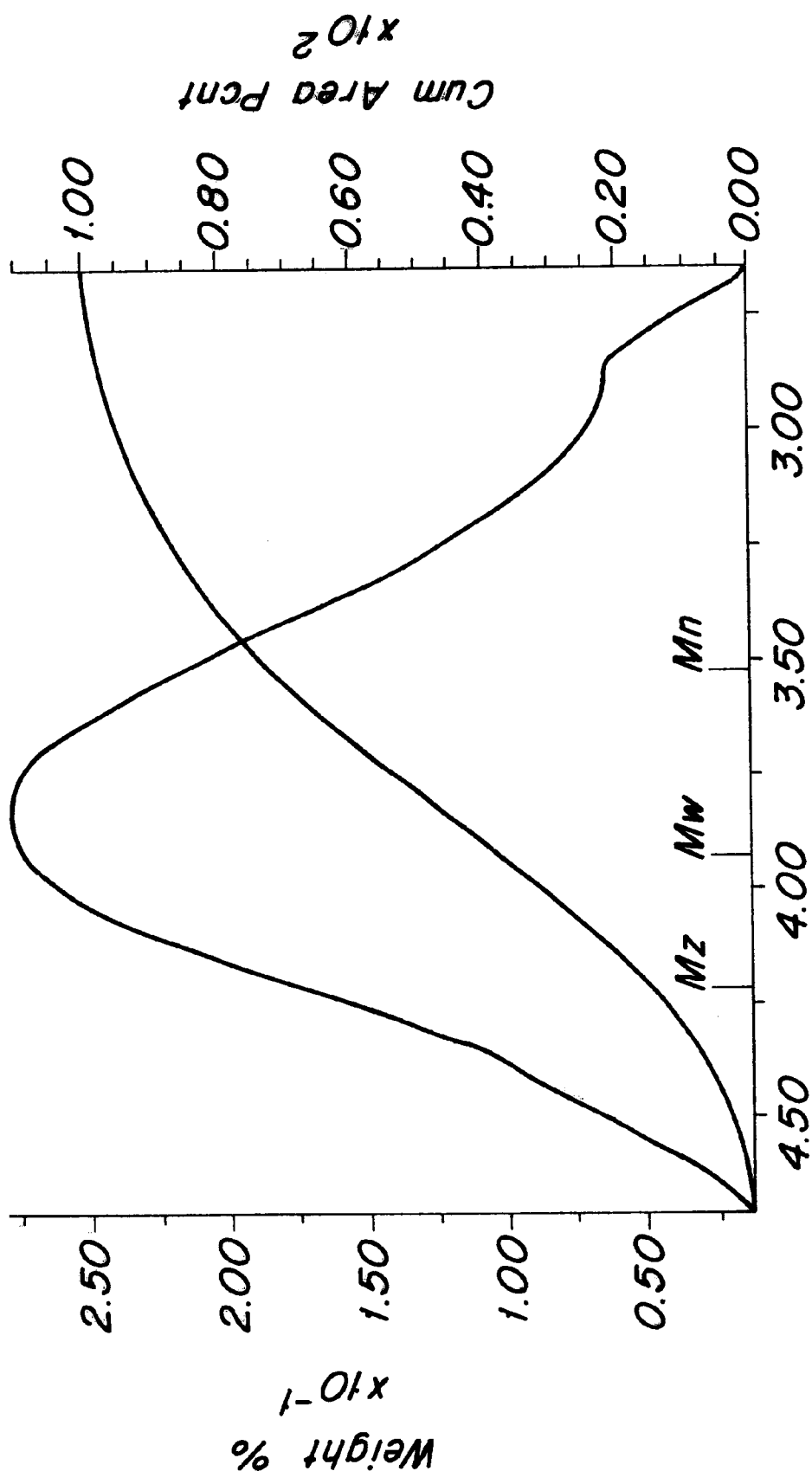
FIG. 3 is a GPC chart of a low-molecular weight polyethylene used in the present invention (a trade name "WEISSEN-0453", made by Nippon Seiro Co., Ltd.)
Figure 4:
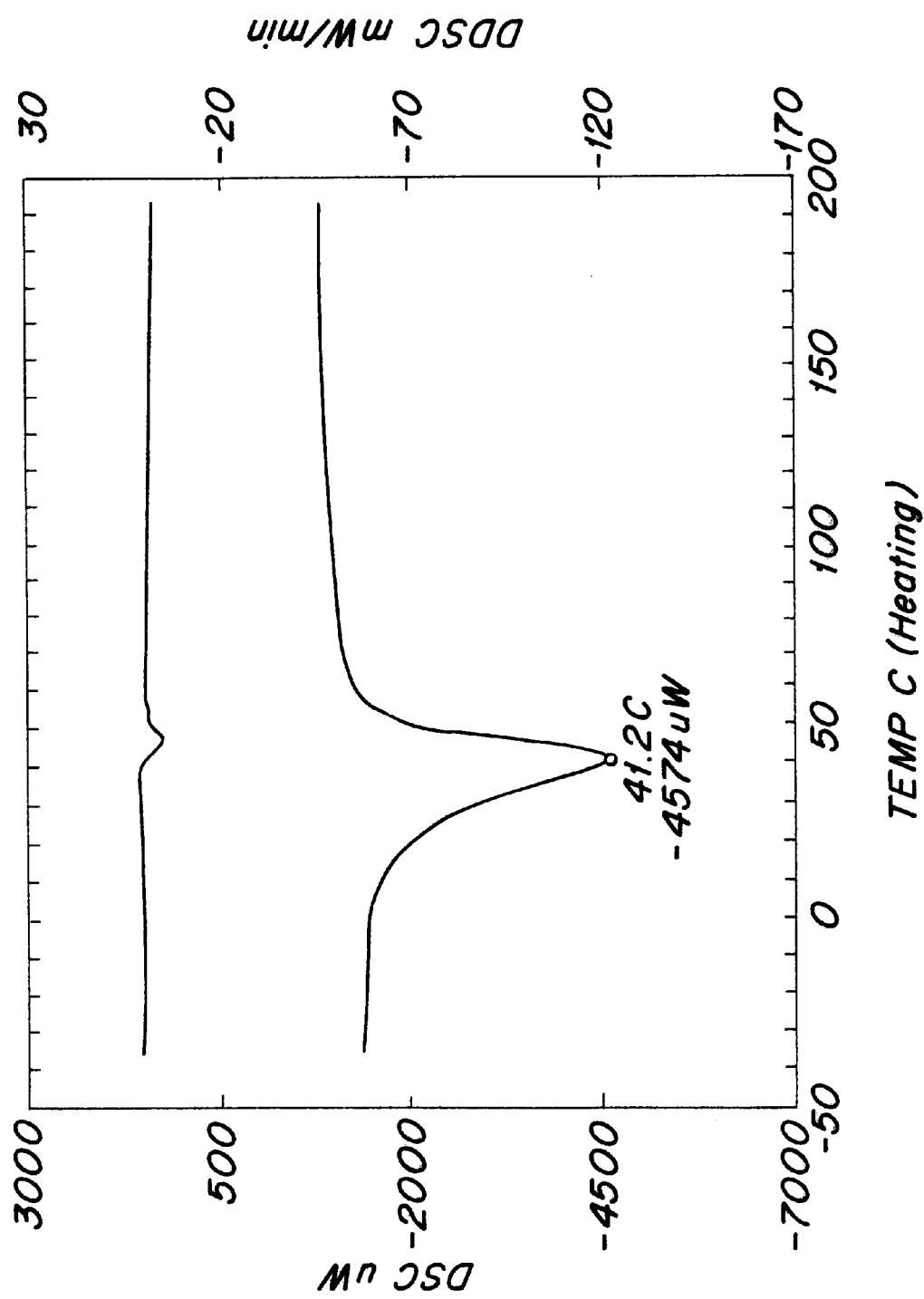
FIG. 4 is a DSC chart of a low-molecular weight polyethylene used in the present invention (a trade name "WEISSEN-0453", made by Nippon Seiro Co., Ltd.)
Figure 5:
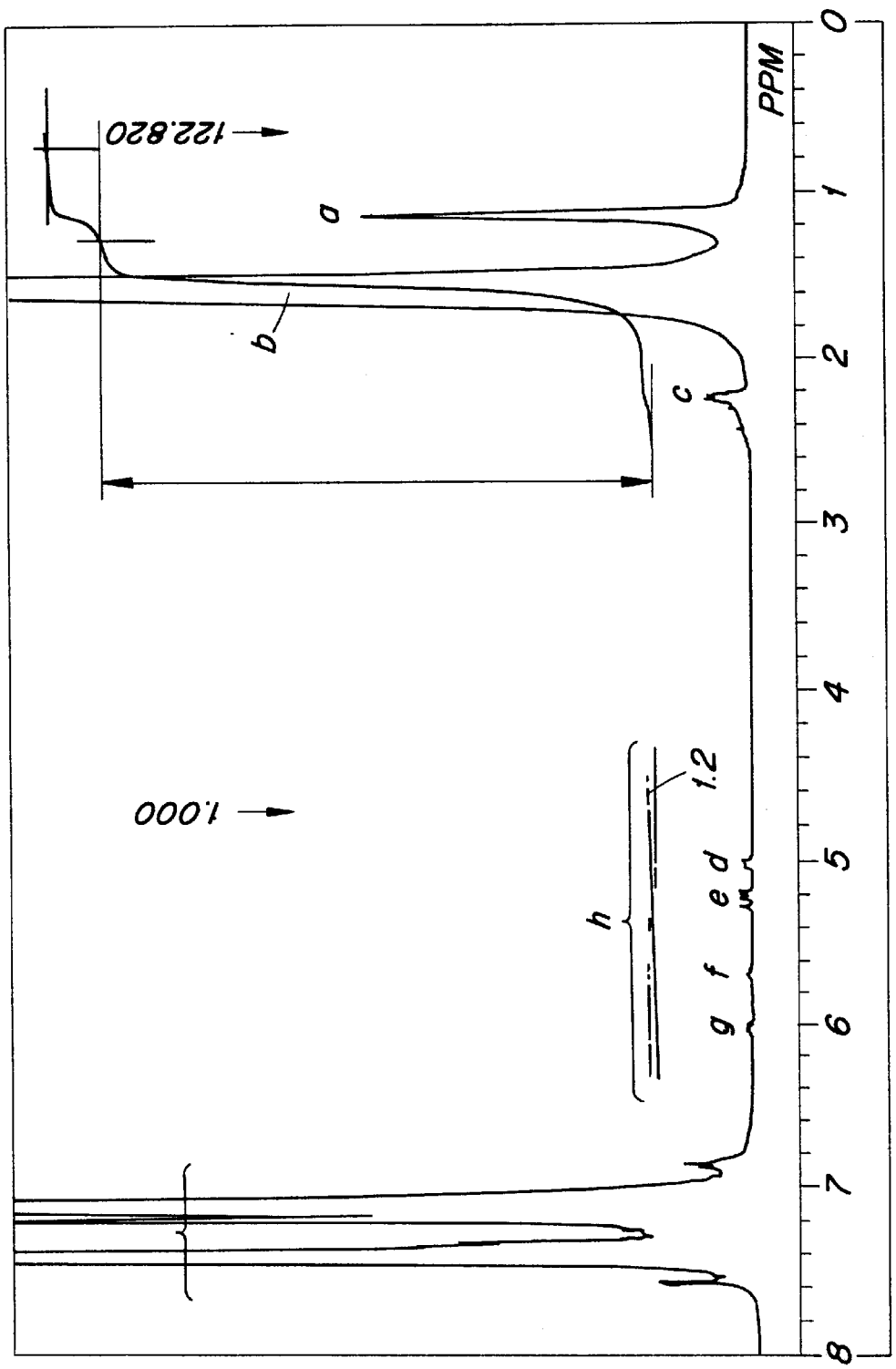
FIG. 5 is an $H^1$-NMR chart of a low-molecular weight polyethylene used in the present invention (a trade name "WEISSEN-0453", made by Nippon Seiro Co., Ltd.)

200 g of a low-molecular weight polyethylene (a trade name "WEISSEN-0453", made by Nippon Seiro Co., Ltd., having the properties as set forth below, whose GPC chart, DSC chart and H$^1$-NMR chart are shown in FIG. 3, FIG. 4 and FIG. 5, respectively) were charged into a one-liter flask and heated for melting at 70° C. in an oil bath. Separately, 785 g of distilled water were charged in a one-liter plastic cup, and 15 g of a sodium alkylsulfate (a trade name "Emal 10", made by Kao Corporation) were added thereto and dissolved therein under stirring. Thereafter, the "Emal 10" aqueous solution was added in the flask at a rate of 50 ml/min. by means of a metering pump while stirring the molten "WEISEEN-0453". After completion of the addition of the "Emal 10" aqueous solution, an aqueous emulsion dispersion thus obtained was pulverized by means of a pulverizer (a trade name "Homomixer", manufactured by Tokushu Kika Kogyo Co., Ltd.) to obtain a fine dispersion, which was then cooled. As a result of measurement of the particle size (by using a trade name "Coulter Counter Model N4", manufactured by Coulter Inc.), the fine dispersion was found to have a mean particle diameter of 5 μm. Further, the fine dispersion was added to water so as to have a content of the active ingredient of 20% and then provided for the tests of Examples 5 and 6. In Example 2, the pellets before dispersing in water were provided for the test as they stood.

[Properties of "WEISEEN-0453"]

Molecular weight by gel permeation chromatography (GPC) in terms of monodispersed polystyrene: MN=3,390, MW=8,480, MW/MN=250

Melting point measured by a differential scanning calorimeter (DSC): 41.2° C.

Density (at 25° C.): 0.89

Number of methyl groups per 100 carbon atoms in the molecule (from the spectrum 4): about 6.3

PREPARATION EXAMPLE 3

1,000 g of polymeric MDI (a trade name "Cosmonate M-400", made by Mitsui Chemicals, Inc.) were charged into a one-liter flask and heated to 80° C. under stirring. After elevation of the temperature, 50 g of a polyoxy polyethylene monoalcohol (a trade name "Uniox M-1000", made by NOF corporation) were charged in the flask, and the mixture was subjected to addition reaction in a nitrogen gas stream. After two hours, the reaction mixture was gradually cooled and then provided for the test of Example 3.

PREPARATION EXAMPLE 4

Figure 6:
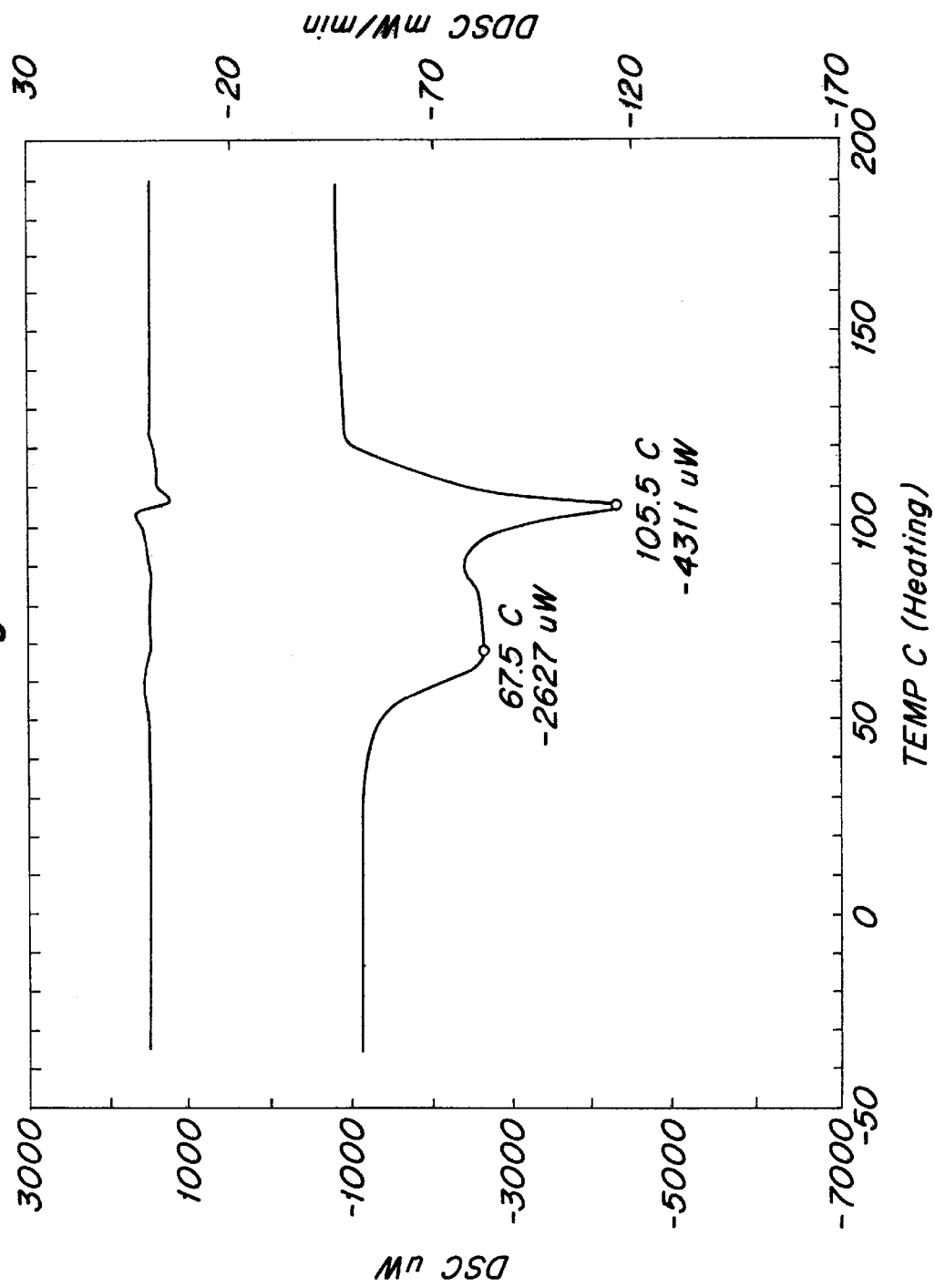
FIG. 6 is a DSC chart of a low-molecular weight polyethylene used in the present invention (a trade name "Mitsui Hiwax 4202E", made by Mitsui Chemicals, Inc.)

The same procedures as in Preparation Example 1 were followed, except that a low-molecular weight polyethylene (a trade name "Mitsui Hiwax 4202E", made by Mitsui Chemicals, Inc., having the properties as set forth below, whose DSC chart is shown in FIG. 6) was used. An aqueous emulsion dispersion thus obtained was further pulverized by means of a pulverizer (a trade name "Homomixer", manufactured by Tokushu Kika Kogyo Co., Ltd.) to obtain a fine dispersion, which was then cooled. As a result of measurement of the particle size (by using a trade name "Coulter Counter Model N4", manufactured by Coulter Inc.), the fine dispersion was found to have a mean particle diameter of 10 μm. Further, the fine dispersion was added to water so as to have a content of the active ingredient of 30% and then provided for the test of Example 3.

[Properties of "Mitsui Hiwax 4202E"]

Molecular weight by gel permeation chromatography (GPC) in terms of monodispersed polystyrene: MN=2,600, MW/MN=2.50

Melting point measured by a differential scanning calorimeter (DSC): 105° C.

Density (at 25° C.): 0.95

Number of methyl groups per 100 carbon atoms in the molecule: about 4.7

PREPARATION EXAMPLE 5

Figure 7:
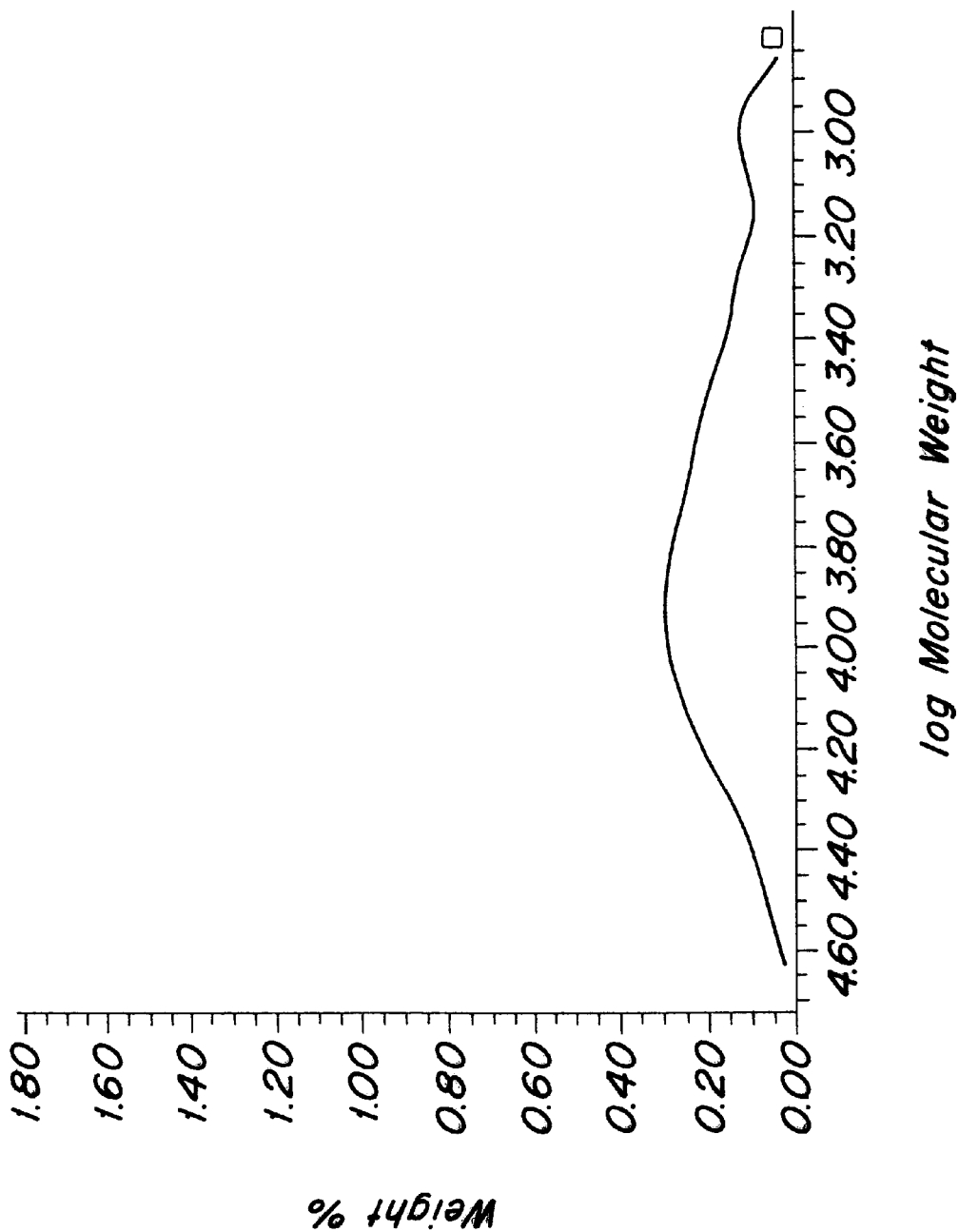
FIG. 7 is a GPC chart of a low-molecular weight polyethylene (a trade name "WEISSEN-0252C", made by Nippon Seiro Co., Ltd.)
Figure 8:
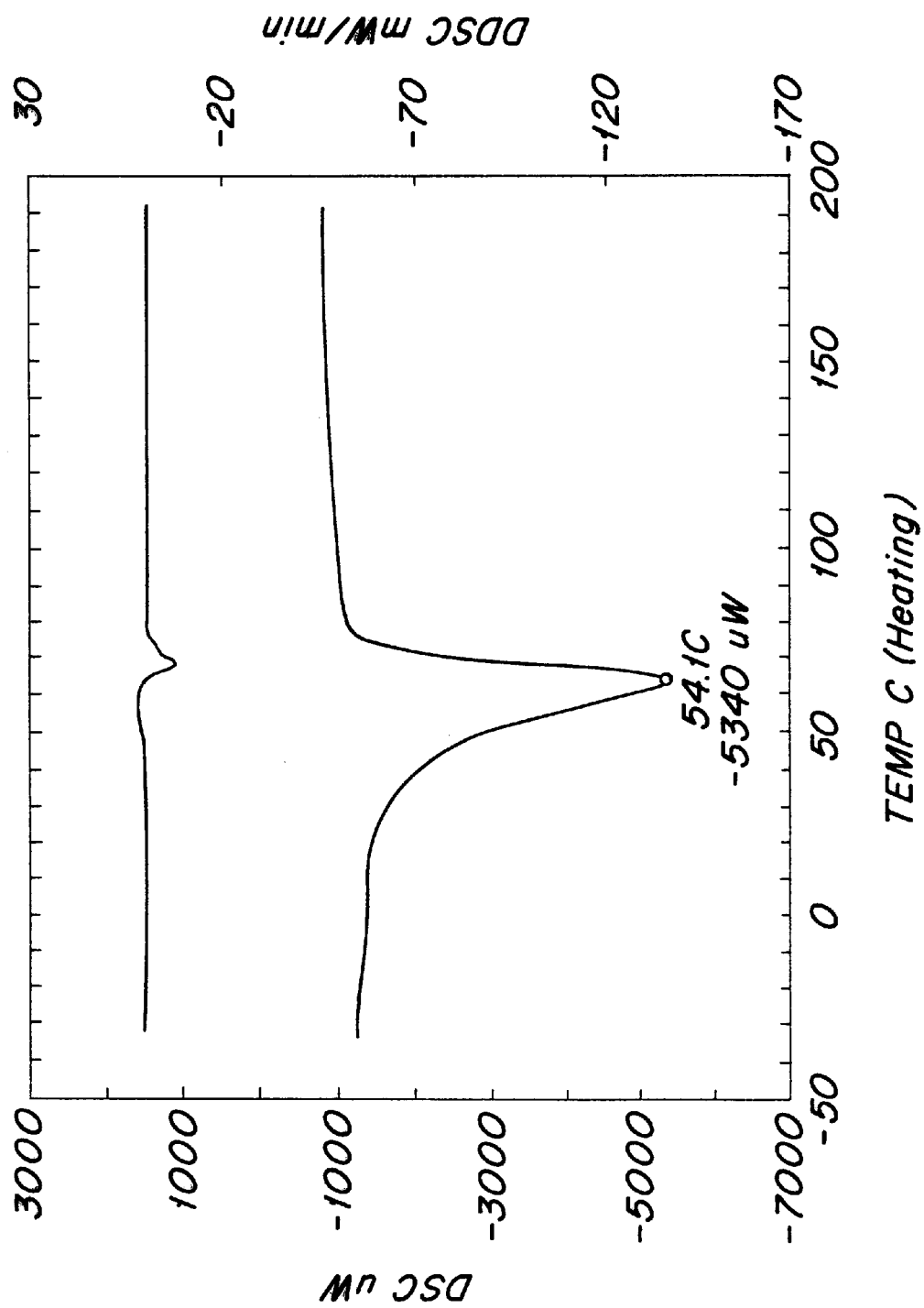
FIG. 8 is a DSC chart of a low-molecular weight polyethylene (a trade name "WEISSEN-0252C", made by Nippon Seiro Co., Ltd.)
Figure 9:
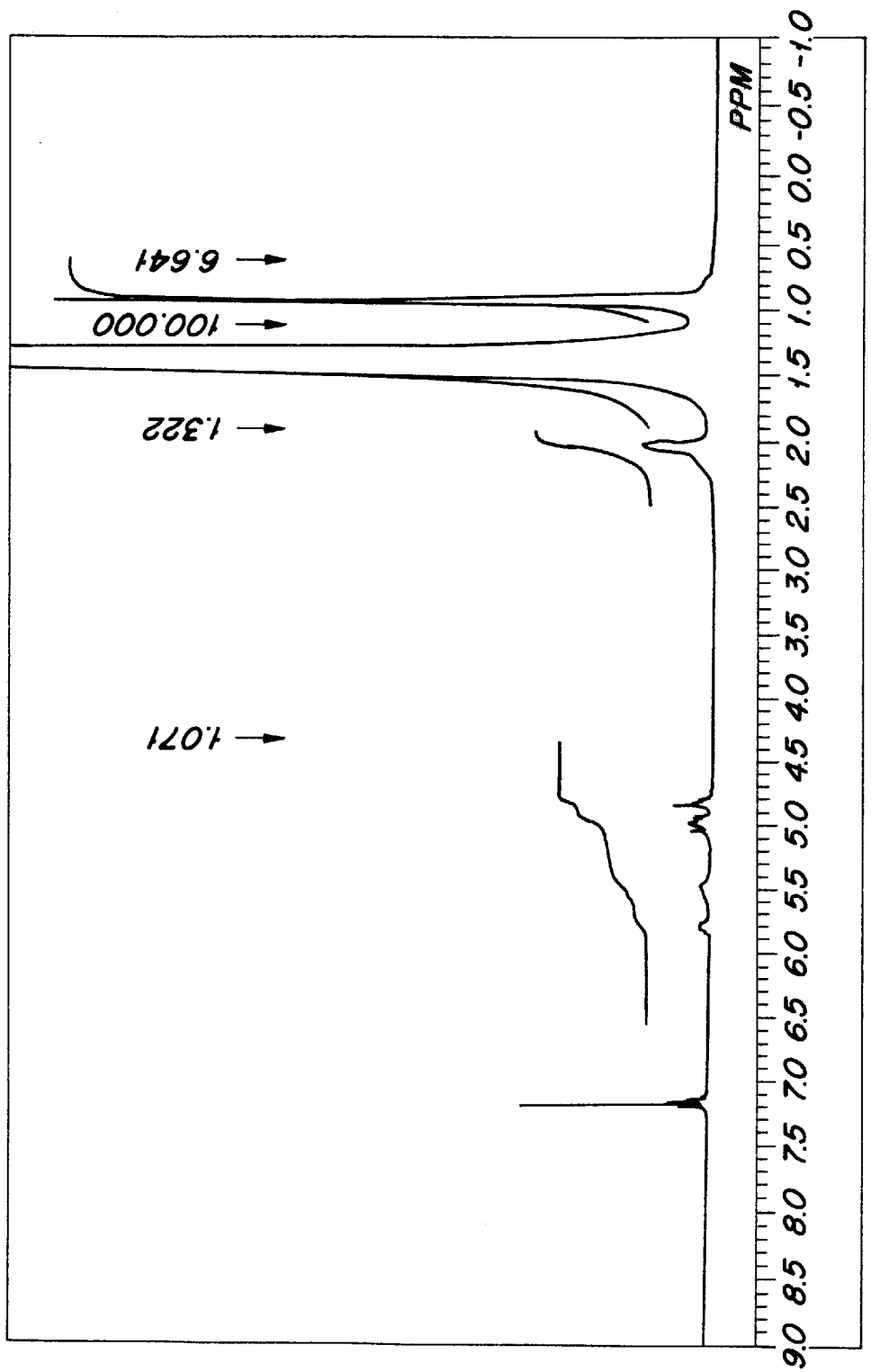
FIG. 9 is an $H^1$-NMR chart of a low-molecular weight polyethylene (a trade name "WEISSEN-0252C", made by Nippon Seiro Co., Ltd.).

300 g of a low-molecular weight low-density polyethylene (a trade name "WEISSEN-0252C", made by Nippon Seiro Co., Ltd., having the properties as set forth below, whose GPC chart, DSC chart and H$^1$-NMR chart are shown in FIG. 7, FIG. 8 and FIG. 9, respectively) were charged into a one-liter flask and heated for melting at 95° C. in an oil bath. Separately, 685 g of distilled water were charged into a one-liter plastic cup, and 15 g of a sodium alkylsulfate (a trade name "Emal 10", made by Kao Corporation) were added thereto and dissolved therein under stirring. Thereafter, the "Emal 10" aqueous solution was added in the flask at a rate of 20 ml/min. by means of a metering pump while stirring the molten "WEISSEN-0252C". After completion of the addition of the "Emal 10" aqueous solution, the resulting emulsion was gradually cooled to obtain an aqueous emulsion dispersion of "WEISSEN-0252C". This dispersion was pulverized by means of a pulverizer (a trade name "Homomic line mill", manufactured by Tokushu Kika Kogyo Co., Ltd.) to obtain a fine dispersion, which was then cooled. As a result of measurement of the particle diameter (by using a trade name "Coulter Counter Model N4", manufactured by Coulter inc.), the fine dispersion was found to have a mean particle diameter of 350 nm. Further, the fine dispersion was added to water so as to have a content of the active ingredient of 30% and then provided for the test of Example 4.

[Properties of "WEISEEN-0252C"]

Molecular weight by gel permeation chromatography (GPC) in terms of monodispesed polystyrene: MN=3,830, MW=8,930, MW/MN=2.33

Melting point measured by a differential scanning calorimeter (DSC): 65° C.

Density (at 25° C.): 0.91

Number of methyl groups per 100 carbon atoms in the molecule (from the spectrum 2): about 4.2

EXAMPLE 1

[Preparation of Board]

1,560 g of a sawdust-like fine wood chips (moisture content: about 9%) were charged into an agitating lade-equipped blender. Then, a polyol (a trade name "EP-280", made by Mitsui Chemicals, Inc.) and the low-molecular weight polyethylene fine dispersion (content of active ingredient: 10%) as prepared in Preparation Example 1 were mixed in a ratio of 0.1:100 as they stood, and the mixture was subjected to high-pressure collision for mixing with polymeric MDI (a trade name "Cosmonate M-200", made by Mitsui Chemicals, Inc.) in a weight ratio of 1:1 under a pressure of 120 kgf/cm$^2$ by means of a high-pressure collision and mixing sprayer (a trade name "H-2000", manufactured by Gusmer Corp.). Immediately after the mixing, the mixture was blown into the chips in the blender in a ratio as shown in Table 1. Thereafter, the chips having the binder composition applied thereonto were taken out and weighed such that a board after molding had a preset density, followed by uniform forming on a caul plate (made of iron) so as to have a size of 30 cm×30 cm. On the resulting board was further covered a caul plate having the same formulation, and the assembly was subjected to hot-pressing under the conditions set forth below. As a result, the releasability was very good, and no adhesion to the caul plate was observed at all even after the continuous preparation by 50 times. The thus prepared board was measured for bending strength in a normal state according to the JIS standards.

[Preparation Conditions of Board]
- Preset thickness: 15 mm
- Preset density: 0.76
- Water content of mat: 14.3%
- Hot press temperature: 180° C.
- Pressing pressure: 30 kgf/cm$^2$
- Pressing time: 3 minutes and 30 seconds
- NCO/OH value: 14,700

[Properties of EP-280]
- Number of functional groups: 3
- Molecular weight: about 6,000
- OH value: 28
- Content of (—CH$_2$CH$_2$—O—) structure: 40%

EXAMPLE 2

[Preparation of Board]

Wood chips of a mixture of needle-leaved tree and broad-leaved tree (5/5) and a low-molecular weight polyethylene (a trade name "WEISSEN-0453", made by Nippon Seiro Co., Ltd.) in a weight ratio of 100:1.2 were charged into MDF manufacture facilities and subjected to defiberation processing by means of steam-pressurized disk refining operation. Polymeric MDI (a trade name "Cosmonate M-300", made by Mitsui Chemicals, Inc.) was applied under pressure in an amount of 100 parts by weight based on 1,250 parts by weight (dry) of the raw material fibers by means of so-called "blow line" by using a gear pump. Thereafter, the fibers were dried until the water content had become about 12% and weighted such that a board after molding had a preset density, followed by uniform forming on a caul plate (made of iron) so as to have a size of 30 cm×30 cm. A caul plate having the same formulation was further covered on the resulting board and the assembly was subjected to hot-pressing under the conditions set forth below. As a result, the releasability was very good, and no adhesion to the caul plate was observed at all even after the continuous preparation by 50 times. The thus prepared board was measured for bending strength in a normal state according to the JIS standards.

[Preparation Conditions of Board]
- Preset thickness: 12 mm
- Preset density: 0.72
- Water content of mat: about 12%
- Hot press temperature: 200° C.
- Pressing pressure: 30 kgf/cm$^2$
- Pressing time: 3 minutes and 30 seconds

EXAMPLE 3

[Preparation of Board]

A bagasse which is an agricultural waste product fiber after extracting the sugar of sugar cane was subjected to solar drying to obtain fibers (water content: about 13%). Then, the fibers were pulverized by means of a hammer mill to obtain fine bagasse fibers. In an agitating blade-equipped blender were charged 3,729 g of the fibers. Subsequently, the fine dispersion (content of active ingredient: 30%) of the oxidation-modified low-molecular weight polyethylene (a trade name "Mitsui Hiwax 4202E", made by Mitsui Chemicals, Inc.) as prepared in Preparation Example 4 was diluted with water 11 times. A 300-ml plastic cup was charged with 110 g of the dilute solution and further with 100 g of the self-emulsifiable polymeric MDI as prepared in Preparation Example 3 to prepare a binder composition. A whole of the binder composition was mixed with and applied onto the above-described fine bagasse fibers in the blender by means of an air sprayer. The fibers having the binder composition applied thereonto were taken out and weighed such that a board after molding had a preset density, followed by uniform forming on a caul plate (made of iron) so as to have a size of 30 cm×30 cm. On the resulting board was further covered a caul plate having the same formulation, and the assembly was subjected to hot-pressing under the conditions set forth below. As a result, the releasability was very good, and no adhesion to the caul plate was observed at all even after the continuous preparation by 50 times. The thus prepared board was measured for bending strength in a normal state according to the JIS.

[Preparation Conditions of Board]
- Preset thickness: 7 mm
- Preset density: 0.72
- Water content of mat: 15.8%
- Hot press temperature: 190° C.
- Pressing pressure: 30 kgf/cm$^2$
- Pressing time: 2 minutes and 30 seconds

EXAMPLE 4

[Preparation of Board]

An aspen material was formed into a flaky state (0.5 mm×40 mm×80 mm) by means of a ring flaker and dried in an oven (water content: about 4%). 2,500 g of the flake were charged into a rotary drum-type blender. Then, the fine dispersion (content of active ingredient: 30%) of the low-molecular weight polyethylene (a trade name "WEISSEN-0252C", made by Nippon Seiro Co., Ltd.) as prepared in Preparation Example 5 was diluted with water 13 times, and 216.7 g of the diluted solution were applied onto the flake by means of an air sprayer. Subsequently, 100 g of polymeric MDI (a trade name "Cosmonate M-200", made by Mitsui Chemicals, Inc.) were sprayed and applied thereonto by means of a high-pressure sprayer. The flake having the binder composition applied thereonto was taken out and weighed such that a board after molding had a preset density, followed by uniform forming on a caul plate (made of iron) so as to have a size of 30 cm×30 cm. In the forming, a three-layer structure was employed, and a weight ratio of surface layer to core layer to surface layer was set to be 2:6:2. Incidentally, the forming was carried out such that the fiber direction of the surface layer was perpendicular to the fiber direction of the core layer. Then, a caul plate having the same formulation was further covered on the resulting board, and the assembly was subjected to hot-pressing under the conditions set forth below. As a result, the releasability was very good, and no adhesion to the caul plate was observed at all even after the continuous preparation by 50 times. The thus prepared board was measured for bending strength in a normal state according to the JIS.

[Preparation Conditions of Board]
  Preset thickness: 20 mm
  Preset density: 0.64
  Water content of mat: 12.0%
  Hot press temperature: 200° C.
  Pressing pressure: 30 kgf/cm$^2$
  Pressing time: 3 minutes and 30 seconds

EXAMPLE 5

[Preparation of Board]

Into a rotary drum-type blender were charged 1,672 g of a so-called "shirasu balloon" (bulk density: about 0.3 g/cm$^3$, water content: 0.1%) which is a finely hollow particle as prepared by heat expanding shirasu. Subsequently, a polyol (a trade name "EP-3033", made by Mitsui Chemicals, Inc.) and the fine dispersion (content of active ingredient: 20%) of the low-molecular weight polyethylene (a trade name "WEISSEN-0453", made by Nippon Seiro Co., Ltd.) as prepared in Preparation Example 2 was diluted with water 3 times. 150 g of the diluted solution were applied onto the shirasu balloon by means of an air sprayer. Subsequently, polymeric MDI (a trade name "Cosmonate M-700", made by Mitsui Chemicals, Inc.) was further sprayed and applied thereonto. The shirasu balloon having the binder composition applied thereonto were taken out and weighed such that a board after molding had a preset density, followed by uniform forming on a caul plate (made of iron) so as to have a size of 30 cm×30 cm. A caul plate having the same formulation was further covered on the resulting board, and the assembly was subjected to hot-pressing under the conditions set forth below. As a result, the releasability was very good, and no adhesion to the caul plate was observed at all even after the continuous preparation by 50 times. The thus-prepared board was measured for flexural strength in a normal state according to the JIS.

[Preparation Conditions of Board]
  Preset thickness: 20 mm
  Preset density: 0.40
  Water content of mat: 8.0%
  Preliminary pressing pressure: 25 kgf/cm$^2$
  Preliminary pressing temperature: 80° C.
  Pressing pressure: Open
  Pressing temperature: 160° C.
  Pressing time: 20 minutes

[Properties of EP-3033]
  Number of functional groups: 4
  Molecular weight: about 6,600
  OH value: 34
  Content of (—CH$_2$CH$_2$—O—) structure: 14%

EXAMPLE 6

[Preparation of Board]

Wood chips of a mixture of needle-leaved tree and broad-leaved tree (5/5) were subjected to defiberation processing by means of steam-pressurized disk refining operation. The thus-obtained fibers were charged in MDF manufacture facilities and applied with the low-molecular weight polyethylene (a trade name "WEISSEN-0453", made by Nippon Seiro Co., Ltd.) as prepared in Preparation Example 2 in a weight ratio of 100:0.5 by means of an air sprayer. Further, polymeric MDI (a trade name "Cosmonate M-200", made by Mitsui Chemicals, Inc.) was applied thereonto in an amount of 100 parts by weight based on 1,250 parts by weight (dry) of the raw material fibers by means of an airless spray gun. Thereafter, the fibers were dried until the water content had become about 12% and weighed such that a board after molding had a preset density, followed by uniform forming on a caul plate (made of iron) so as to have a size of 30 cm×30 cm. On the resulting board was further covered a caul plate having the same formulation, and the assembly was subjected to hot-pressing under the conditions set forth below. As a result, the releasability was very good, and no adhesion to the caul plate was observed at all even after the continuous preparation by 50 times. The thus-prepared board was measured for bending strength in a normal state according to the JIS.

[Preparation Conditions of Board]
  Preset thickness: 12 mm
  Preset density: 0.72
  Water content of mat: about 12%
  Hot press temperature: 180° C.
  Pressing pressure: 30 kgf/cm$^2$
  Pressing time: 3 minutes and 30 seconds

COMPARATIVE EXAMPLE 1

[Preparation of Board]

1,430 g of a sawdust-like fine wood chips (moisture content: about 0.0%) was charged in an agitating blade-equipped blender. Then, 10 g of a powder of a low-molecular weight polyethylene (a trade name "WEISSEN-0252C", made by Nippon Seiro Co., Ltd.) was mixed therewith. Thereafter, 100 g of polymeric MDI (a trade name "Cosmonate M-200", made by Mitsui Chemicals, Inc.) were blown onto the chips in the blender by means of a sprayer. The chips were taken out and weighed such that a board after molding had a preset density, followed by uniform forming on a caul plate (made of iron) so as to have a size of 30 cm×30 cm. A caul plate having the same formulation was further covered on the resulting board, and the assembly was subjected to hot-pressing under the conditions set forth below. As a result, a board was not molded due to insufficient setting. Thus, no evaluation of a board was carried out.

[Preparation Conditions of Board]
  Preset thickness: 15 mm
  Preset density: 0.76
  Water content of mat: 0.0%
  Hot press temperature: 180° C.
  Pressing pressure: 30 kgf/cm$^2$
  Pressing time: 3 minutes and 30 seconds

COMPARATIVE EXAMPLE 2

[Preparation of Board]

Wood chips of a mixture of needle-leaved tree and broad-leaved tree (5/5) were subjected to defiberation processing by means of steam pressurized disk refining operation. Polymeric MDI (a trade name "Cosmonate M-200", made by Mitsui Chemicals, Inc.) was applied under pressure in an amount of 100 parts by weight (dry) based on 1,250 parts by weight of the raw material fibers by means of so-called "blow line" by using a high-pressure pump. Thereafter, the fibers were dried until the water content had become about 12% and weighed such that a board after molding had a preset density, followed by uniform forming on a caul plate (made of iron) so as to have a size of 30 cm×30 cm. On the resulting board was further covered a caul plate having the same formulation, and the assembly was subjected to hot-pressing under the conditions set forth below. As a result, the board remarkably adhered to the caul plate. Thus, no evaluation of a board was carried out.

[Preparation Conditions of Board]
 Preset thickness: 12 mm
 Preset density: 0.72
 Water content of mat: about 12%
 Hot press temperature: 200° C.
 Pressing pressure: 30 kgf/cm²
 Pressing time: 3 minutes and 30 seconds
 The results obtained are summarized in Table 1.

(B) a low molecular weight polyethylene having a density of from 0.800 to 0.980 and a number average molecular weight of from 500 to 7,000 as a releasing agent, and
(C) water as an active hydrogen containing compound necessary for setting component (A),
the weight ratio of the compound having at least two isocyanate groups or the reaction product thereof (A) to the low-molecular weight polyethylene (B) being in the range of from 1:0.001 to 1:1, and the weight ratio of the

TABLE 1

| Construction | Example 1 | Example 2 | Example 3 | Example 4 | Example 5 | Example 6 | Comparative Example 1 | Comparative Example 2 |
|---|---|---|---|---|---|---|---|---|
| (A) Organic polyisocyanate | | | | | | | | |
| Type | M-200 | M-300 | M-400 | M-200 | M-700 | M-200 | M-200 | M-200 |
| Ratio | 100 | 100 | 100 | 100 | 100 | 100 | 100 | 100 |
| (B) Low density polyethylene | | | | | | | | |
| Type | 200P | WEISSEN-0453 | 4202E | WEISSEN-0252C | WEISSEN-0453 | WEISSEN-0453 | WEISSEN-0252C | — |
| Ratio | 10 | 15 | 3 | 5 | 10 | 0.5 | 10 | — |
| Shape | 10% Dispersion | Pellets | 30% Dispersion | 30% Dispersion | 20% Dispersion | 20% Dispersion | Powder | — |
| (C) Water | Yes | Yes | Yes | Yes | Yes | Yes | No | Yes |
| (D) Monofunctional alcohol | | | | | | | | |
| Type | — | — | M-1000 | — | — | — | — | — |
| Ratio | — | — | 5.0 | — | — | — | — | — |
| (E) Polyol | | | | | | | | |
| Type | EP-280 | — | — | — | EP-3033 | — | — | — |
| Ratio | 0.1 | — | — | — | 3.0 | — | — | — |
| Raw material of board | | | | | | | | |
| Type | Wood chip | Wood fiber | Bagasse | Wood flake | Shirasu balloon | Wood fiber | Wood chip | Wood fiber |
| Water content (%) | 9 | | 13 | 4 | 0 | | 0 | |
| Ratio | 1,430 | 1,250 | 3,300 | 2,500 | 1,670 | 1,250 | 1,430 | 1,250 |
| Releasability | Good | Good | Good | Good | Good | Good | Not measured | Bad |
| Physical properties | | | | | | | | |
| Bending strength (N/mm²) | 21.8 | 35.6 | 18.6 | 36.6 | 3.6 | 34.2 | — | — |
| Density (g/cm²) | 0.76 | 0.72 | 0.72 | 0.64 | 0.40 | 0.72 | 0.76 | 0.72 |

In the production of a hot press molded board made of a lignocellulose and/or an inorganic material as a main raw material by using the binder composition and production method of the present invention, the releasability of the board from a hot plate is eternally good, and the productivity of the system is remarkably improved, although an isocyanate binder is used for hot-press molding. At the same time, the resulting board has superior physical properties and a low hygroscopic linear expansion coefficient. In addition, since a conventional formaldehyde-based binder is not used, it is possible to reduce or make free from the release of formaldehyde from a molded board, resulting in no contamination of the environment.

What is claimed is:

1. A board which comprises a lignocellulose-based material or an inorganic material and a binder composition comprising:
   (A) a compound having at least two isocyanate groups, or a reaction product thereof selected from a dimer, trimer or prepolymer of the compound having at least two isocyanate groups or a reaction product of (D) a monofunctional alcohol having from 80 to 99% of a recurring unit of (—CH₂CH₂—O—) and a compound having at least two isocyanate groups as a binder component, binder composition to the lignocellulose or the inorganic material being in the range of from 1:100 to 30:100.

2. The board as claimed in claim 1, wherein the low-molecular weight polyethylene (B) has a ratio of the weight average molecular weight (MW) to number average molecular weight (MN) by gel permeation chromatography of from 1.2 to 3.0.

3. The board as claimed in claim 2, wherein the MN of the low-molecular weight polyethylene (B) is from 1,000 to 6,000 in terms of monodispersed polystyrene and the ratio of the MW to MN is from 1.5 to 3.0.

4. The board as claimed in claim 1, wherein the low-molecular weight polyethylene (B) has a branched structure.

5. The board as claimed in claim 1, wherein the low-molecular weight polyethylene (B) has a density of from 0.800 to 0.925.

6. The board as claimed in claim 1, wherein the low molecular weight polyethylene (B) has a functional group selected from —OH, —COOH, and —CHO and has a density exceeding 0.940.

7. The board as claimed in claim 1, wherein the low-molecular weight polyethylene (B) has an endothermic peak by a differential scanning calorimeter (DSC) at from 30° C. to 120° C.

8. The board as claimed in claim 7, wherein the low-molecular weight polyethylene (B) has an endothermic peak by a differential scanning calorimeter (DSC) at from 40° C. to 110° C.

9. The board as claimed in claim 1, wherein the low-molecular weight polyethylene (B) has at least two methyl group carbon atoms per 100 carbon atoms in the low-molecular weight polyethylene (B).

10. The board as claimed in claim 9, wherein the low-molecular weight polyethylene (B) has at least three methyl group carbon atoms per 100 carbon atoms in the low-molecular weight polyethylene (B).

11. The board as claimed in claim 1, wherein the low-molecular weight polyethylene (B) is used as an aqueous dispersion comprising the water (C) as a dispersion medium.

12. The board as claimed in claim 11, wherein the aqueous contains the low-molecular weight polyethylene with a mean particle size of from 100 to 10,000 nm.

13. The board as claimed in claim 1, wherein the compound having at least two isocyanate groups or reaction product thereof (A) is emulsified or dispersed in water by using (E) a bifunctional to octafunctional polyol having from 5 to 70% by weight of a recurring unit of ($-CH_2CH_2-O-$) in the structure thereof.

14. The board as claimed in claim 13, wherein the compound having at least two isocyanate groups or reaction product thereof (A), the low-molecular weight polyethylene (B), the water (C), and the polyol (E) are formed in an aqueous dispersion by using an in-line mixer.

15. The board as claimed in claim 1, wherein the compound having at least two isocyanate groups or reaction product thereof (A) is polymeric MDI (polymethylene polyphenyl diisocyanate).

* * * * *